(12) United States Patent
Jones

(10) Patent No.: US 6,439,139 B1
(45) Date of Patent: Aug. 27, 2002

(54) METHOD FOR RECYCLING BUILDING MATERIALS

(75) Inventor: David R. Jones, Tampa, FL (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 0 days.

(21) Appl. No.: 09/715,745

(22) Filed: Nov. 17, 2000

(51) Int. Cl.[7] .................................................. F23B 7/00
(52) U.S. Cl. ...................................... 110/346; 110/342
(58) Field of Search .............................. 110/342, 345, 110/346, 347; 432/14, 15

(56) References Cited

U.S. PATENT DOCUMENTS

| | | | |
|---|---|---|---|
| 4,028,049 A | * 6/1977 | Naudy et al. | 432/14 |
| 4,081,285 A | * 3/1978 | Pennell | 106/100 |
| 4,179,263 A | * 12/1979 | Jung et al. | 432/1 |
| 4,295,823 A | * 10/1981 | Ogawa et al. | 432/106 |
| 4,541,245 A | * 9/1985 | Becker et al. | 60/648 |
| 4,600,438 A | * 7/1986 | Harris | 106/100 |
| 4,640,681 A | * 2/1987 | Steinbiss et al. | 432/14 |
| 4,756,761 A | 7/1988 | Philip et al. | |
| 5,086,716 A | * 2/1992 | Lafser | 100/345 |
| 5,392,721 A | 2/1995 | Judd | |
| 5,454,333 A | 10/1995 | Von Seebach et al. | |
| 5,473,998 A | 12/1995 | Allen et al. | |
| 5,853,474 A | 12/1998 | Hilton | |
| 5,888,256 A | 3/1999 | Morrison | |
| 5,989,017 A | * 11/1999 | Evans | 432/14 |
| 6,213,764 B1 | * 4/2001 | Evans | 432/106 |

FOREIGN PATENT DOCUMENTS

JP 109152 * 10/1998

OTHER PUBLICATIONS

The Cement Industy, A History of Cement, www.portcement.org/indhist. htm.

* cited by examiner

Primary Examiner—Ira S. Lazarus
Assistant Examiner—K. B. Rinehart
(74) Attorney, Agent, or Firm—Inger H. Eckert; James J. Dottavio

(57) ABSTRACT

A method of recycling building materials is described, including the steps of introducing the building material into a cement kiln, and combusting a combustible portion of the building material as a fuel within the kiln. The noncombustible portion of the building material is incorporated into a clinker material within the kiln.

19 Claims, 1 Drawing Sheet

METHOD FOR RECYCLING BUILDING MATERIALS

BACKGROUND OF THE INVENTION

1. Field of the Invention

This invention is related generally to a method and apparatus for recycling building materials in a cement kiln as a supplemental fuel source and source of raw material for the cement.

2. Prior Art

Cement is produced by heating raw materials, forming a closely controlled chemical combination of calcium, silicon, aluminum, iron and small amounts of other ingredients. Common among the materials used in its manufacture are inorganic materials, such as limestone, shells, and chalk or marl combined with shale, clay, slate or blast furnace slag, silica sand, and iron ore. Lime and silica typically make up about 85% of the mass. The raw materials are heated in a cement kiln at high temperatures of typically 2600° F. to 3000° F. (1430° C. to 1650° C.). The inorganic minerals are "digested" in the kiln through a very complex set of chemical reactions, yielding oxides, and then finally complex silicates, which comprise the clinker. At 2700° F. (1480° C.), this series of chemical reactions cause the materials to fuse and create cement clinker-grayish-black pellets, often the size of marbles. Clinker is discharged red-hot from the lower end of the kiln in marble-sized pieces, and is transferred to various types of coolers to lower the clinker to handling temperatures. Cooled clinker is combined with gypsum and ground into a fine gray powder. The clinker is ground so fine that nearly all of it passes through a No. 200 mesh (75 micron) sieve. This fine gray powder is portland cement.

The raw materials are placed in the high end and as the kiln rotates the materials move slowly toward the lower end. Flame jets located at the lower end of the kiln heat the materials in the kiln. The kiln heat drives off, or calcines, the chemically combined water and carbon dioxide from the raw materials and forms new compounds (tricalcium silicate, dicalcium silicate, tricalcium aluminate and tetracalcium aluminoferrite). Of the material that goes into the feed end of the kiln, about 67% is discharged as clinker.

As described in U.S. Pat. No. 5,454,333, pumpable and solid hazardous wastes have been used a supplemental fuel to produce the heat for heating the mixture. Such wastes are typically used primarily for the heat value thereof.

U.S. Pat. No. 5,888,256, which is incorporated herein by reference, describes a process for using various waste fuel sources, analyzing the ash of each, and adjusting the raw material inputs for the cement based on the ash composition. Such wastes are previously known wastes used in such processes, such as sludge waste and such.

U.S. Pat. No. 5,888,256, which is incorporated herein by reference, describes a process for using various waste fuel sources, analyzing the ash of each, and adjusting the raw material inputs for the cement based on the ash composition. Such wastes are previously known wastes used in such processes, such as industrial waste sludge. The '256 patent requires a minimum of two waste streams, and blending and grinding to achieve a maximum 1000-micron particle size with a minimum BTU value and a maximum ash content. Accordingly, the '256 patent restricts the type and form of wastes which can be used.

U.S. Pat. No. 8,833,474 describes using waste materials from electric arc furnaces to supplement the input materials for cement to provide an inexpensive raw material, but not to recover fuel value therefrom.

Asphalt shingles have been used extensively as a roofing material for the construction of buildings. In the process of making shingles, an organic or glass mat is coated with asphalt filled with limestone or dolomite, and inorganic granules are imbedded in the filled asphalt. Waste product from such an operation, or shingles removed from a house after their useful life, are sent to a landfill, due to the variety of materials used and the difficulty in separation of such materials. Often during the removal of old shingles form a house, nails used in the installation thereof, as well as rotten boards, tar paper, vents and other such materials are removed and sent with the shingles to the landfill. Furthermore, composite shingles have come into use in the recent past, an example of which is the Owens Corning Mira Vista® Shake, which comprises a filled polymeric shingle. Similar to the asphalt shingle, such a composite shingle may be recycled by combusting the polymeric material and using any filler materials therefrom as a component of the cement. Furthermore, other building materials such as siding materials, including asphalt siding, cedar siding, cementious siding and such, may be recycled in a similar manner.

It would be desirable to find an alternative disposal method for scrap building materials from the manufacturing process and building renovations, including asphalt shingles.

BRIEF SUMMARY OF THE INVENTION

According to the present invention, an improved recycling process is described to recycle building materials. As such, the disposal costs and landfill space for such materials are avoided. Furthermore, the energy value of such materials is recovered, and the inorganic constituents of the shingles or recycled building materials are incorporated and become part of the minerals useful in the manufacture of cement, reducing the cost for these inputs in the manufacture of cement.

Accordingly, a method of recycling building materials is described, including the steps of introducing the building material into a cement kiln, and combusting a combustible portion of the building material as a fuel within the kiln. The noncombustible portion of the building material is incorporated into a clinker material within the kiln.

BRIEF DESCRIPTION OF THE FIGURE

The FIGURE is a schematic side view of a cement production facility using the present invention.

DETAILED DESCRIPTION OF THE PREFERRED EMBODIMENTS

Figure 1:
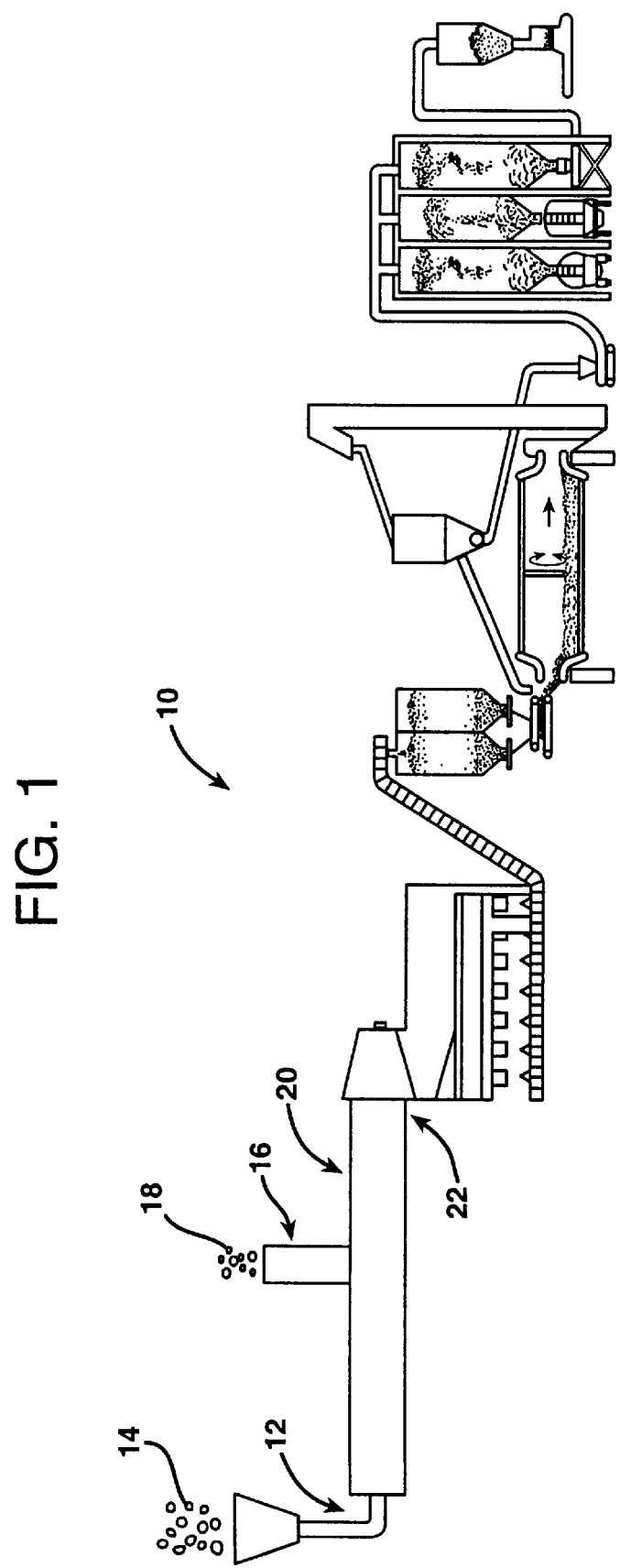

Cement is produced by preparing the necessary raw materials in the necessary proportions and in the proper physical state of fineness and intimate contact so that chemical reactions can take place at the calcining and sintering temperatures in the kiln to form the end product, typically referred to as clinker. In general, the raw materials are crushed, passed through grinding, separation and mixing apparatuses and then introduced to a kiln.

As noted in the Background section, to reduce energy expense, numerous methods have been suggested to introduce waste materials in the kiln during the manufacture of Portland cement. U.S. Pat. No. 3,572,524 describes an apparatus for charging sludges and other similar waste materials to the feed end of a rotary incinerating kiln using an endless screw-conveyor. U.S. Pat. No. 4,850,290 to Benoit et al., describes a method for charging drums of solid hazardous waste directly into the central portion of a rotary kiln or into the feed end housing of a kiln. U.S. Pat. No. 5,454,333, describes a continuous feed method for various waste materials, such as tires or drums of hazardous waste, and describes various other methods for introducing solid hazardous waste fuels into the rotary kilns. These patents are incorporated herein by reference for these such teachings.

The FIGURE gives a schematic overall diagram of a cement production apparatus 10. A kiln 20 includes an input end 12. Raw materials 14 are input into the input end 12 in a known manner. As taught in the prior art references, such input materials may enter into a precalciner kiln system prior to introduction into the kiln 20. The kiln 20 may optionally include a supplemental fuel introduction system 16, as described in the '256 patent. If so equipped, fuel 18 is introduced as described therein. As noted above, after the materials are calcinated, clinker is dispensed from the exit end 22 of the kiln and handled in a known manner. The material input system used with the present invention may include a number of systems as described in the prior art and are therefore not described herein in detail.

Scrap shingles, either the byproduct of the manufacturing process for roofing shingles, or shingles which are removed from an existing house, may be used as a fuel and raw material for the production of portland cement. Such shingles include asphalt coating, which is useful as a fuel within the kiln. The asphalt coating includes filler materials, such as limestone, which is an input material for cement. The shingles further include a mat, made from either organic material, which is further useful as fuel, or a glass fiber mat. The glass fiber mat, when separated from the asphalt and granules within the kiln, provides a source of silica, which is another input material for the cement. The silica is then combined with the other cement inputs within the kiln, and is formed into the clinker. Normally, shingles include granules, which provide further crushed and screened minerals, which provide additional inputs for the concrete. Fiberglass asphalt shingles typically comprise about 20% asphalt, 2% glass fiber, 65% limestone, and the balance comprises various materials, mostly minerals.

When a roof is stripped of shingles, additional building materials, such as roofing underpayment (frequently asphalt coated glass or organic mat), rubberized sheeting (ice guard), nails, wood from the roof deck, roof vents, and other materials are also removed and discarded with the shingles. The nails provide iron, another input to the cement; while the felt may provide fuel and glass; while the wood provides additional fuel for the kiln. As such, scrap shingles provide several inputs to the cement manufacturing process, as both fuel and raw materials, unlike other previously proposed waste materials. As such, preferably the mixture of inputs to the cement manufacturing process is determined and modified in a manner as described in the '256 patent to create the desired clinker formulation.

Preferably, the building materials, including the shingles, may be introduced without grinding into the raw material hopper (12), and the rotating kiln. Within the kiln, combustion of the organics destroys the structure of the shingles and other building materials, and the remaining inorganic materials are fully incorporated into the clinker within the kiln.

In a similar manner, natural shingles, such as cedar shakes, may be disposed as a fuel source in a cement kiln. Furthermore, composite shingles have come into use in the recent past, an example of which is the Owens Corning Mira Vista® Shake, which comprises a filled polymeric shingle. Similar to the asphalt shingle, such a composite shingle may be recycled by combusting the polymeric material and using any filler materials therefrom as a component of the cement.

Similarly, other building materials may be recycled in a similar manner, using the fuel value of the materials in the cement kiln, while using the noncombustible components as additional raw materials for the cement. Examples include siding materials, such as vinyl siding, asphalt siding, cedar siding, cementious siding and such, may be recycled in a similar manner. Likewise, fiberglass insulation may be recycled by placing such within the kiln, and although mostly noncombustible, provides silica and other inorganic constituents for the cement.

The embodiments were chosen and described to provide the best illustration of the principles of the invention and its practical application to thereby enable one of ordinary skill in the art to utilize the invention in various embodiments and with various modifications as are suited to the particular use contemplated. Also such modifications and variations are within the scope of the invention as determined by the appended claims when interpreted in accordance with the breadth to which they are fairly, legally and equitably entitled.

What is claimed is:

1. A method of recycling building materials having a combustible portion and a noncombustible portion into a cement material, comprising:
   introducing the building materials into a cement kiln;
   combusting the combustible portion of the building materials as a fuel within the kiln; and
   incorporating the noncombustible portion of the building materials into a clinker material within the kiln wherein an organic portion of the building materials is combusted and an inorganic portion of the building materials is incorporated into the clinker material, wherein the building materials comprises a shingle, the recycling process further comprising the steps of: combusting an asphalt material from a glass substrate of the shingle; and incorporating said substrate into said clinker material as a source of minerals for said cement material.

2. A method according to claim 1, wherein said substrate further comprises silica and useful elements comprising Calcium and Aluminum which are incorporated into said clinker material as a source of minerals for said cement material.

3. A method according to claim 1, further comprising:
   removing the building materials from a building before introducing the building materials into a cement kiln.

4. A method according to claim 3, wherein the building materials comprise siding.

5. A method of recycling building materials comprising shingles having a combustible portion and a noncombustible portion into a cement material, comprising:
   introducing the shingles into a cement kiln;
   combusting an asphalt portion of the shingles from a glass substrate of the shingles as a fuel within the kiln; and
   incorporating said substrate and a limestone or dolomitic filler material from the asphalt as a source of minerals, including calcium and magnesium from said filler, in said cement material.

6. A method according to claim 5, wherein the shingle further comprises surface granules, said granules providing a source of minerals in said cement.

7. A method according to claim 6, wherein said shingle comprises scrap from the manufacture of roofing shingles.

8. A method of recycling building materials comprising a shingle into a cement material, comprising:

removing the building materials, including the shingle, from a building along with further building materials selected from the group consisting of nails, wood, felt paper, ice shield, and roofing accessories;

introducing the building materials into a cement kiln;

combusting an asphalt material from a glass substrate of the shingle as a fuel within the kiln and incorporating said substrate into said clinker material as a source of minerals for said cement material;

combusting a combustible portion of the further building materials as a fuel within the kiln; and incorporating the noncombustible portion of the building materials into a clinker material within the kiln, wherein each of said further building materials provides fuel or raw materials for said cement material.

9. A method according to claim 8, wherein the asphalt is filled with limestone or dolomite and the limestone or dolomite provides a source of calcium and magnesium in said cement.

10. A method according to claim 9, wherein the further building materials comprises nails and wherein said nails provide iron for said cement.

11. A method according to claim 10, wherein said shingle further comprises surface granules, said granules providing a source of minerals in said cement.

12. A method of recycling building materials comprising shingles having a combustible portion and a noncombustible portion into a cement material, comprising:

introducing the shingles into a cement kiln;

combusting the combustible portion of the shingles as a fuel within the kiln; and incorporating the noncombustible portion of the shingles into a clinker material within the kiln;

wherein an organic portion of the shingles is combusted and an inorganic portion of the shingles is incorporated into the clinker material.

13. A method of recycling building materials comprising shingles having a combustible portion and a noncombustible portion into a cement material, comprising: introducing the shingles into a cement kiln;

combusting the combustible organic portion of the shingles as a fuel within the kiln, wherein the shingles comprise asphalt and wherein the recycling process further comprising the steps of combusting said asphalt and an organic substrate of the shingles; and incorporating the noncombustible inorganic portion of the shingles into a clinker material within the kiln.

14. A method according to claim 13, wherein the shingle further comprises surface granules, said granules providing a source of minerals in said cement.

15. A method according to claim 14, wherein the shingle further comprises a filler material in said asphalt and wherein filler providing a source of minerals in said cement.

16. A method according to claim 12, wherein the shingle comprises a filled asphalt, the recycling process further comprising the steps of:

combusting said asphalt from a glass substrate of the shingle; and incorporating said substrate into said cement material as a source of silica.

17. A method of recycling building materials comprising a shingle including a mineral-filled asphalt and a filler material into a cement material, the method comprising:

introducing the shingle into a cement kiln;

combusting the asphalt as a fuel within the kiln; and incorporating the filler material of the asphalt as a source of lime, and a glass mat as a source of silica, into a clinker material within the kiln.

18. A method of recycling asphalt shingles according to claim 17, further comprising the step of incorporating a surfacing granule as a source of minerals into a clinker material within the kiln.

19. A method of recycling building materials comprising a resinous shingle comprising a filler and having a combustible portion and a noncombustible portion into a cement material, the method comprising:

introducing the shingle into a cement kiln;

combusting the resin from a filler material of the shingle as a fuel within the kiln; and incorporating the filler into said cement material as a source of minerals.

* * * * *